United States Patent
Honey et al.

(10) Patent No.: US 9,844,183 B2
(45) Date of Patent: Dec. 19, 2017

(54) CAM REEL WITH COMPLEX BAT PATH

(71) Applicant: Honey Bee Manufacturing Ltd., Frontier (CA)

(72) Inventors: Gregory Honey, Frontier (CA); Glenn Honey, Frontier (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 190 days.

(21) Appl. No.: 14/226,796

(22) Filed: Mar. 26, 2014

(65) Prior Publication Data

US 2015/0272003 A1   Oct. 1, 2015

(51) Int. Cl.
*A01D 57/02*   (2006.01)
*A01D 57/03*   (2006.01)

(52) U.S. Cl.
CPC .......... *A01D 57/025* (2013.01); *A01D 57/02* (2013.01); *A01D 57/03* (2013.01)

(58) Field of Classification Search
CPC combination set(s) only.
See application file for complete search history.

(56) References Cited

U.S. PATENT DOCUMENTS

| | | |
|---|---|---|
| 12,750 A | 4/1855 | Chatfield |
| 524,215 A | 8/1894 | Quigley |
| 2,413,072 A | 12/1946 | Sage |
| 2,694,894 A | 11/1954 | Linscheld |
| 3,468,109 A | 9/1969 | Reimer |
| 3,472,008 A | 10/1969 | Hurlburt |
| 3,512,348 A | 5/1970 | West et al. |
| 3,550,366 A | 12/1970 | Gibson |
| 3,771,299 A | 11/1973 | Gradwohl et al. |
| 3,927,512 A | 12/1975 | Molzahn |
| 3,945,180 A | 3/1976 | Sinclair |
| 4,038,810 A | 8/1977 | Williams et al. |
| 4,067,177 A | 1/1978 | Tout |
| 4,120,137 A | 10/1978 | Schoenberger et al. |
| 4,127,981 A | 12/1978 | Parrish et al. |
| 4,137,696 A | 2/1979 | Webb |
| 4,156,340 A | 5/1979 | Colgan et al. |

(Continued)

FOREIGN PATENT DOCUMENTS

| | | |
|---|---|---|
| CA | 1003310 | 1/1977 |
| CA | 1040438 | 10/1978 |

(Continued)

OTHER PUBLICATIONS

EPO Search Report for international application No. EP14167462.2 dated Jul. 29, 2015.

*Primary Examiner* — Alicia Torres

(57) ABSTRACT

A cam reel for use on a harvesting header which includes a plurality of reel bats disposed evenly around the reel shaft, each attached to radial arms extending outwardly from the reel shaft by bat arms pivotally attached to the radial anus such that the bat member itself can pivot about a pivot axis around the end of the radial arms. The reel ends of the radial anus define a circular bat path and the reel bats once attached can be pivoted about the pivot axis, parallel to the reel axis, in a bat pivot path to move both inside and outside of the radius of the circular bat path. The reel can be attached to various header assemblies using interchangeable end kits. A header using the reel is also disclosed.

42 Claims, 7 Drawing Sheets

(56) References Cited

U.S. PATENT DOCUMENTS

| | | |
|---|---|---|
| 4,174,602 A | 11/1979 | Webb et al. |
| 4,177,625 A | 12/1979 | Knight et al. |
| 4,187,664 A | 2/1980 | Meek et al. |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,435,948 A | 3/1984 | Jennings |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,124 A | 2/1986 | Seiferling |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,751,809 A | 6/1988 | Fox et al. |
| 4,776,155 A | 10/1988 | Fox et al. |
| 4,833,869 A | 5/1989 | Klein |
| 4,909,026 A | 3/1990 | Molzahn et al. |
| 4,936,082 A | 6/1990 | Majkrzak |
| 4,944,141 A | 7/1990 | Orlando et al. |
| 4,956,966 A | 9/1990 | Patterson |
| 5,005,343 A | 4/1991 | Patterson |
| 5,007,235 A | 4/1991 | Nickel et al. |
| 5,086,613 A | 2/1992 | Fox et al. |
| 5,155,983 A | 10/1992 | Sheehan et al. |
| 5,157,905 A | 10/1992 | Talbot et al. |
| 5,243,810 A | 9/1993 | Fox et al. |
| 5,261,290 A | 11/1993 | Ramsay et al. |
| 5,359,839 A | 11/1994 | Parsons et al. |
| 5,435,239 A | 7/1995 | Talbot |
| 5,459,986 A | 10/1995 | Talbot et al. |
| 5,473,872 A | 12/1995 | Fox et al. |
| 5,535,577 A | 7/1996 | Chmielewski et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,704,200 A | 1/1998 | Chmielewski, Jr. et al. |
| 5,768,870 A | 6/1998 | Talbot et al. |
| 5,791,128 A | 8/1998 | Rogalsky |
| 5,927,606 A | 7/1999 | Patterson |
| 5,992,759 A | 11/1999 | Patterson |
| 6,029,429 A | 2/2000 | Fox et al. |
| 6,044,636 A | 4/2000 | Minnaert |
| 6,079,194 A | 6/2000 | Waldrop |
| 6,170,244 B1 | 1/2001 | Coers et al. |
| 6,195,972 B1 | 3/2001 | Talbot et al. |
| 6,199,358 B1 | 3/2001 | Majkrzak |
| 6,282,876 B1 | 9/2001 | Patterson |
| 6,324,823 B1 | 12/2001 | Remillard |
| 6,351,931 B1 | 3/2002 | Shearer |
| 6,397,573 B2 | 6/2002 | Majkrzak |
| 6,442,918 B1 | 9/2002 | Fox |
| 6,453,655 B2 | 9/2002 | Ferraris |
| 6,502,379 B1 * | 1/2003 | Snider ............... A01D 57/02 56/221 |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 | 3/2004 | Guyer |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 | 11/2006 | Remillard et al. |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |
| 7,328,565 B2 | 2/2008 | Snider et al. |
| 7,340,876 B1 | 3/2008 | Barnett |
| 7,347,277 B2 | 3/2008 | Enns et al. |
| 7,356,982 B2 | 4/2008 | Barnett |
| 7,364,181 B2 | 4/2008 | Patterson |
| 7,373,769 B2 | 5/2008 | Talbot et al. |
| 7,392,124 B2 | 6/2008 | MacGregor et al. |
| 7,392,646 B2 | 7/2008 | Patterson |
| 7,438,305 B2 | 10/2008 | Schulz |
| 7,444,798 B2 | 11/2008 | Patterson et al. |
| 7,454,888 B2 | 11/2008 | Barnett |
| 7,461,498 B1 | 12/2008 | Barnett |
| 7,467,505 B2 | 12/2008 | MacGregor |
| 7,472,533 B2 | 1/2009 | Talbot et al. |
| 7,484,349 B2 | 2/2009 | Talbot et al. |
| 7,497,069 B2 | 3/2009 | Enns et al. |
| 7,647,755 B2 | 1/2010 | Barnett et al. |
| 7,721,830 B2 | 5/2010 | Dunn et al. |
| 7,730,707 B2 | 6/2010 | Pietricola et al. |
| 7,849,952 B2 | 12/2010 | MacGregor et al. |
| 7,856,801 B2 | 12/2010 | Remillard |
| 7,918,076 B2 | 4/2011 | Talbot |
| 7,958,706 B2 | 6/2011 | Remillard et al. |
| 8,006,469 B2 | 8/2011 | Barnett |
| 8,015,784 B2 | 9/2011 | Barnett et al. |
| 8,020,363 B1 | 9/2011 | Barnett et al. |
| 8,020,648 B2 | 9/2011 | Otto |
| 8,056,311 B1 | 11/2011 | Barnett |
| 8,069,640 B2 | 12/2011 | Barnett et al. |
| 8,096,102 B2 | 1/2012 | Smith |
| 8,117,812 B2 | 2/2012 | Patterson |
| 8,161,719 B2 | 4/2012 | Barnett et al. |
| 8,176,716 B2 | 5/2012 | Coers et al. |
| 8,225,589 B2 | 7/2012 | Barnett |
| 8,225,903 B2 | 7/2012 | Dunn |
| 8,240,114 B2 | 8/2012 | Barnett |
| 8,245,489 B2 | 8/2012 | Talbot |
| 8,286,411 B2 | 10/2012 | Barnett et al. |
| 8,286,412 B2 | 10/2012 | Kidd et al. |
| 8,291,684 B2 | 10/2012 | Remillard et al. |
| 8,291,686 B1 | 10/2012 | Cormier et al. |
| 8,307,620 B1 | 11/2012 | Barnett et al. |
| 8,333,057 B2 | 12/2012 | Schroeder et al. |
| 8,341,927 B2 | 1/2013 | Barnett |
| 8,387,351 B2 | 3/2013 | Guyer |
| 8,402,728 B2 | 3/2013 | Kidd |
| 8,408,567 B2 | 4/2013 | Bergman et al. |
| 8,434,290 B2 | 5/2013 | Barnett et al. |
| 8,468,789 B2 | 6/2013 | Barnett et al. |
| 8,484,938 B2 | 7/2013 | Cormier et al. |
| 8,484,939 B1 | 7/2013 | Cormier et al. |
| 8,511,050 B1 | 8/2013 | Cormier et al. |
| 8,590,284 B2 | 11/2013 | Rayfield |
| 2004/0139715 A1 * | 7/2004 | Bickel ............... A01D 57/03 56/220 |
| 2012/0251653 A1 | 10/2012 | Mathy, Jr. et al. |
| 2012/0260870 A1 | 10/2012 | Wahl et al. |
| 2013/0036860 A1 | 2/2013 | Corniani |
| 2014/0001726 A1 | 1/2014 | Statz |
| 2014/0033940 A1 | 2/2014 | Simpson et al. |
| 2014/0150601 A1 | 6/2014 | McGrath |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |

(56) References Cited

FOREIGN PATENT DOCUMENTS

| | | |
|---|---|---|
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 A1 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| DE | 10339152 B3 * | 12/2004 ............ A01D 57/03 |
| EP | 1935226 | 6/2008 |
| WO | 2012/166629 | 12/2012 |

\* cited by examiner

CAM REEL WITH COMPLEX BAT PATH

TECHNICAL FIELD

This invention is in the field of harvesting equipment, and in particular for rotary reels on crop material harvesting or cutting headers and the drive systems used therefore.

BACKGROUND

It is known in the field of crop harvesting equipment to employ harvesting headers to cut crops for various purposes, such as feeding a combine harvester or swathing crop material.

At the front of a combine or swather is the portion referred to as the header. A typical header is equipped with a cutter bar, and a conveyor deck or surface behind the cutter bar onto which cut crop material will fall, and a rear wall of the header which extends up from the rear of the crop catching surface. Typically a rotating reel with a plurality of bats disposed around a reel shaft and axis is used to sweep the standing crop towards the cutter bar as the header and attached harvesting machine is moved through the field. The reel bats also assist in ensuring that the cut crop falls into the conveyor system of the header once it has been cut. In the early 1930's the idea of using a fingered pick-up reel was conceived, and fingered reels are standard equipment on most header designs in use today.

The reel in a harvesting header is typically designed to be approximately the same width as the header. The reel shaft is mounted between two rotational mounts at either end thereof, with a power drive attached to rotate the reel shaft. There are then a plurality of reel bats with fingers or fingers therealong which are equally spaced about the reel shaft, held in position by a plurality of radially extending arms out from the shaft, or a round mounting at the ends of the shaft allowing for the holding of the ends of the reel bats in their positions spaced equally and away from the reel shaft. Rotation of the reel shaft results in the rotation of the reel bats and fingers through the crop in front of the header, drawing the crop material into the cutter bar and the remainder of the device.

A typical reel design includes 6 bats spaced equally around the circumference of the reel, each of which carries a row of fingers, such that reel bats are located at intervals of 60° around the reel. In prior art reels each bat sequentially engages and sweeps the crop towards the cutter bar as the reel rotates. The rotation rate of the reel is engineered such that the speed of movement of the tips of fingers closely matches the forward speed of the harvester, in order to optimize the sweeping effect of the fingers.

Harvesting headers now manufactured with fingers attached to the reel bats typically have the reel bats themselves rotatably mounted in relation to their attachment points, and include a cam mechanism that by selective or guided rotation of the reel bat during the rotation of the overall reel, allows the tips of the fingers to follow a more complex path, into, through and out of the crop material as the reel turns. The cams could be different shapes including circular or otherwise, dependent upon the path of travel that is desired to be created for the fingers. A couple of examples of prior art patents in the area of the use of cam mechanisms to orient or adjust the orientation of the fingers on reel bats during the rotation of a harvesting header reel are U.S. Pat. Nos. 4,005,858 and 5,768,870.

In prior art cam reel systems, the reel bats themselves are typically rotatably mounted at the distal ends of a plurality of radial arms extending from the reel shaft, or within rotatable mounts on a circular framework or ring attached in position around the reel shaft, such that when viewed from the side over in cross-section, during rotation of the reel shaft the reel bats themselves move in a circular bat path around the reel shaft, and the engagement of the reel bats with at least one cam results only in the rotation of the reel bat members within their rotational attachments such that the fingers extending from each reel that are rotated by the camming action while the reel bats themselves move in their circular bat path. It is believed that a cam reel for use in a harvesting header which actually allowed for the movement of the reel bat members towards and away from the reel shaft during rotation of the reel would be a novel approach allowing for a more customized and optionally more aggressive reel behavior which may be desirable in certain cases.

Some of the prior art cam reel systems which try to allow for a modest degree of adjustability of the cam path and the resultant camming behavior of the reel and operation accomplish this by allowing for interchangeable sections to be attached into or out of a particular cam track, or the cam itself can be removed and replaced with one of a different size or shape to redefine the cam path. It is contemplated that an alternate approach which allowed for the reorientation or adjustment of the cam path by allowing for the movement of the cam itself between a plurality of predefined working positions would provide for a necessary degree of customized behavior while simplifying significantly the implementation of this adjustable aspect of a cam reel.

SUMMARY OF THE INVENTION

As outlined above, the present invention is generally speaking directed to the concept of a cam reel with a complex bat path for use in a harvesting header, which is to say that the reel bats themselves can during operation and rotation of the reel move towards and away from the reel shaft and inside and outside of the radius of a reel bat path during their camming behavior.

The typical harvesting header in respect of which this reel design would be used includes a frame for attachment to a power unit such as a swather or a combine—or in certain cases the frame may include wheels and a hitch for pull behind or trailing with a tractor etc. the frame has two reel ends which define the width of the header from the perspective of the width of the cutting pass which can be made through a crop. There is a conveyor deck between the two reel ends of the frame, carrying a conveyor system for the movement of cut crop material along the conveyor deck to a header discharge. There is also a cutter bar assembly along the forward edge of the conveyor deck which will cut crop material as it is engaged by the header under power through the crop.

The harvesting header of the present invention could take many different forms in terms of the discharge or its use. For example it could be a side discharge header, such as is sometimes used in swathing applications, or it could be a center discharge header which has a center discharge at the center of the header defined by the conveyor deck in the rear wall. The center discharge area if simply left open would provide the ability for the header to drop a swath onto the field surface at the center thereof, or if the harvesting header of the present invention is going to be used with a combine harvester or the like there may be a discharge conveyor system onto which the crop material would be discharged by the header.

There are numerous types of transverse conveyor systems which can be used in accordance with the remainder of the present invention as well. This primarily contemplated that the header of the present invention would be manufactured with the Draper system as the transverse conveyor, to carry the crop material across the conveyor deck, but there could also be augers or other items used in that place.

The key differentiator of the present invention from harvesting header and cam reel combinations in the prior art is in the reel assembly itself which is used. The crop harvesting header of the present invention includes a reel for moving crop material into the cutter bar and onto the conveyor deck, which in its construction and configuration accomplishes the goals of the present invention. The reel includes a reel shaft which has a first end and a second end and a reel axis. The reel shaft is rotatably mounted to and between the reel ends of the frame, and also has a rotational power source connected thereto for the purpose of rotation of the reel shaft in operation of the header. Rotational power will be applied to the reel shaft in operation of the header and the reel will then rotate around the reel axis defined by the shaft.

The reel will also include a plurality of reel bats which are mounted in spaced apart positions around the circumference of the reel shaft. It is specifically contemplated that in some embodiments of the reel of the present invention will be six reel bats, although the remainder of the system and configuration could be modified for any number of reel bats and any number is contemplated to be within the scope of the present invention. Each reel bat has a bat member with a bat axis, and a plurality of crop fingers attached thereto and extending generally radially outwardly from the reel shaft. The crop fingers will engage the crop material as the header and the reel on the front of the header are moved through a standing crop. It is specifically contemplated that the bat member of the reel bat could comprise an extruded tube or the like to which the crop fingers could be attached, although many different types of reel that members could be employed in accordance with the remainder of the present invention, so long as they could be properly fixedly mounted in accordance with the remainder of the invention, and any type of a bat member which could be fixedly mounted with the crop fingers attachable thereto such that they would extend generally radially outwardly from the reel shaft are contemplated within the scope hereof.

The reel bats as outlined are attached in spaced apart positions around the circumference of the reel shaft. It is specifically contemplated that each reel bat would be attached by and correspond to a plurality of radial arms extending outwardly from the reel shaft. These radial arms which attach the reel bats in a typical cam reel design are sometimes interchangeably referred to as "spiders" in the prior art as well. It is specifically contemplated that at least two radial arms would be required for the mounting of each reel back to the reel shaft, one of each pair of such at least two radial arms being in proximity to each end of the reel shaft and the bat member. For increased rigidity or stability in the construction of the remainder of the reel however, more than two radial arms could be used with respect to one or more that members and any number of radial arms used to attach each reel bat is contemplated within the scope of the present invention. Each radial arm which extended outward from the reel shaft would have a distal end. The distal end of each radial arm would be attached to a bat arm which had a reel end and a bat end, bipedal attachment of the reel and of the bat arm corresponding thereto to the distal end of the radial arm, whereby each bat arm could pivot about the reel end of its corresponding radial arm, in a plane generally perpendicular to the reel axis.

The radial arms for all of the reel bats would be generally the same length as well of the bat arms for each reel bat, and the reel ends of the radial arms would define when viewed from the side a circular bat path through which the radial arms would move during rotation of the reel shaft.

Each pairing of a radial arm and a bat arm would be fixedly attached at the bat end of the bat arm to its corresponding reel bat member. Unlike the cam reels of the prior art, the bat members of the reel bats would not be attached rotatably in relation to the bat axis defined by the bat member but rather would be fixedly attached to provide more rigidity to the finished reel assembly. The rotational or pivotal movement of the bat member in relation to the reel shaft is accomplished otherwise in the reel design of the present invention by pivoting of the bat members about their respective pivot axis defined by the ends of the radial arms. The reel bat once attached can be pivoted about the pivot axis defined by the ends of the radial arms, which is parallel to the reel axis, in a bat pivot path which will allow for movement of the reel bat itself both inside and outside of the radius of the circular bat path. This will allow, in conjunction with the cam hardware of the reel design, for a more complex camming behavior of the reel by virtue of the fact that the cam is actually moving the entire reel bat towards and away from the reel axis, rather than simply rotating it around its bat axis.

The reel itself, being the reel shaft with the reel bats attached thereto, would cooperate with a first cam mounted on the frame of the header perpendicular to the reel axis first end of the reel shaft. The first cam would be inside of the circular bat path. Each reel bat, in addition to its pivotal attachment by a plurality of bat arms corresponding to the radial arms therefore, would include a first cam follower which comprise the first link arm and at least one first cam engagement point for engaging the first cam. The first link arm would be attached to its corresponding reel bat by a crank arm, wherein during rotation of the reel shaft each first cam follower would engage and follow the first cam and the corresponding crank arm could pivot the attached reel bat around its pivot axis, moving it inside and outside of the circular bat path and towards and away from the reel shaft and the reel axis.

Finally, the design would also include an end pivot stabilizer which comprises a circular first end shield attached to the frame about the reel shaft near the first end thereof, around the outside of the first cam, which defines a first bat guide path which is generally the same as the circular bat path. An end follower which extends out from the first end of each reel bat along the pivot axis of the bat, for engaging the circular first end shield, would complete the end pivot stabilizer configuration. On rotation of the reel shaft, the end follower of each reel that would be engaged in relation to and follow the circular first end shield while the first cam follower attached to that reel bat is actuated by the first cam to pivot the reel bat in relation to its pivot axis.

It is specifically contemplated that the first cam could be adjustable between a plurality of predetermined working positions. The cam itself is a straightforward component—many different type of cam and cam follower combinations will be understood by those skilled in the art and could be used in accordance with the remainder of the present invention. However, the cam in terms of its adjustability between a plurality of predetermined working positions is specifically contemplated to potentially be rotatably mounted to its point of attachment to the frame such that it could be released and rotated to one of the predetermined working positions and then locked in that position.

It is specifically contemplated that in terms of the cam followers used in the reel of the present invention that the first cam follower could be a dual first cam follower, engaging the first camera to first cam engagement points such that the link arm of the first cam follower always extends outwards perpendicular from the tangent of the lobe of the first cam defined by the two first cam engagement points at any given time. The use of dual cam followers each engaging the cam at more than one point provides for the necessary rigidity and camming behavior to optimally accomplish the remainder of the objectives of the present invention. Many prior art cam reel designs use single cam followers—it is contemplated that single cam followers could in certain circumstances also operate in accordance with the remainder of the present invention herein without departing from the intention hereof although the dual cam followers shown herein are the desired approach at the present time.

The crop harvesting header of the invention could also include a second cam assembly at the second end of the reel shaft, which would mirror and coordinate with the first cam assembly of the first end of the reel shaft. The second cam would be mounted on the frame at a mirrored position on the frame to the attachment of the first cam at or near the first end, perpendicular to the reel axis near the second end of the reel shaft, the second cam being inside of the circular bat path and being a mirror shape of the first cam. The use of a mirror second cam attached at a mirrored position of the second end would as outlined provide for coordinated camming of both ends of each reel bat during operation of the reel.

In this type of an embodiment, there would also be a second cam follower corresponding to each reel bat, which comprise the second link arm and at least one second cam engagement point for engaging the second cam. The second link arm would be attached to its corresponding reel back by a second crank arm, wherein during rotation of the reel shaft each second cam follower would engage and follow the second cam in the corresponding second crank arm would pivot the attached reel bat around its pivot axis. There would also be a second end pivot stabilizer in this type of an embodiment which comprised a circular second end shield attached to the frame about the reel shaft near the second end thereof, around the outside of the second cam, which defined the second bat guide path which was generally the same as the circular bat path, and a corresponding second end follower extending outwards from the second end of each reel bat along the pivot axis of the bat for engaging the circular in shield. In operation of this type of a embodiment of the reel of the present invention, on rotation of the reel shaft the second end follower of each reel bat would be engaged in relation to unfold the circular second end shield while the second cam follower attached to the reel that was actuated by the second cam to pivot the reel bat in relation to the pivot axis. As in the case of the adjustable first cam being adjustable between a plurality of predetermined working positions, the second cam might also be adjustable between a plurality of predetermined working positions. Where the first cam and the second cam were both adjustable between a plurality of predetermined working positions, the predetermined working positions of each of the first cam and the second cam would be the same.

As in the case of the first cam followers, the second cam followers are also contemplated the most likely be dual cam followers each engaging the second cam up to second cam engagement points such that the second link arm of the second cam follower always extends outwards perpendicular from the engine of the lobe of the second cam defined by the two second cam engagement points at any given time.

The invention includes a harvesting header including the cam reel of the present invention, as well as a cam reel and associated mounting hardware which is designed for attachment to a number of harvesting header assemblies which will accomplish the method of the present invention.

In the case of a cam reel of the present invention which is provided for mounting to a pre-existing harvesting header assembly, a plurality of interchangeable end kits could be created each of which was a set of mounting hardware created for the specific mounting of a cam reel of a fixed length to the remainder of a harvesting header. The use of different end kits comprising frame attachment hardware for different types of harvesting headers which would allow for the attachment of the cam reel of the present invention along with the cams and end pivot stabilizers thereof to the frame of the header will be understood to those skilled in the art.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF THE INVENTION

The following discussion provides many example embodiments of the inventive subject matter. Although each embodiment represents a single combination of inventive elements, the inventive subject matter is considered to include all possible combinations of the disclosed elements.

Harvesting headers, as outlined elsewhere herein and understood to those skilled in the art of crop harvesting technology are the cutting face attachment which is typically used either with a swather or windrowing machine, or with a combine harvester or the like. The header typically includes a reel rotatably mounted approximately perpendicular to the working direction of travel of the implement, which will when rotated feed crop material from the field into a cutter bar mounted along the front of the header, and once it passes over the cutter bar and is cut, deposit that cut crop material into an auger or onto a draper conveyor which will feed it either to a discharge in a swather or windrowing machine, or into the feed or throat of a combine harvester etc. Different types of headers have been developed over the years which behave differently in different types of crop material as well as are of varying construction and width. The width of the header is one of the primary determining factors of the speed of harvesting, since a wider header can cut a wider windrow or swath resulting in the faster processing of a crop in field. As outlined above and as is understood to those skilled in the art of the manufacturing operation of harvesting equipment, over the last number of years reel assemblies that use a cam construction at the ends of the reel to rotatably orient the reel bats and the fingers thereon during rotation of the reel have become the norm.

Figure 1:
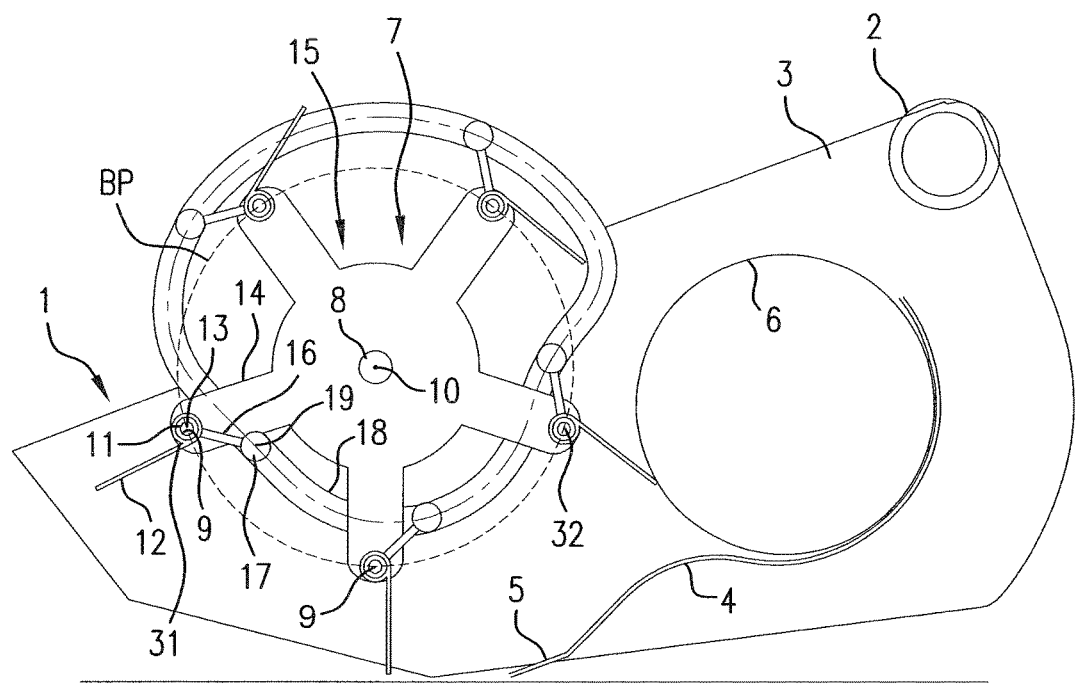
FIG. 1 is a schematic side elevational view of a prior art cam reel of a harvesting header.

FIG. 1 is a schematic side elevational view of a prior art cam reel of a harvesting header. This Figure has been extracted from Canadian Patent No. 2358883. Many of the components of the typical harvesting header are demonstrated in this Figure and it is shown for this purpose as well to inform the understanding of the reader in the general state of the art and the technology.

The general configuration of the header includes a frame structure, shown at 1, which includes a main beam 2 extending across the width of the frame 1 and two end frame members 3 which extend forward from the rear of the header and away from the main beam 2.

The frame structure 1 also includes a deck 4 onto which crop material after it is cut is placed. The deck 4 extends between the end frame members 3. There is a cutter bar 5 shown as well, along the front of the deck 4, which will cut the crop material as the reel feeds it therein. The harvesting header shown employs an auger 6 for the feeding of crop material to the discharge or throat across the deck 4. Other types of headers use a draper conveyor in place of or in addition to an auger 6 and both such approaches will be understood to be contemplated within the scope of the present invention in terms of utility or applicability of the cam reel configuration of the present invention.

In addition to the transverse conveyor deck 4, which extends between the end frame members 3, there is also a reel 7 which extends across the width of the header above and reaching forward of the cutter bar 5. This conventional reel 7 includes a shaft 8 which is rotationally attached to the end frame members 3 so that the position of the shaft 8 is fixed relative to the cutter bar 5. The reel 7 also includes a plurality of reel bats 9 which are in equally spaced positions around the axis 10 of the shaft 8. The reel bats 9 are rotatably attached so that they can rotate within their mountings which the shaft 8 and the reel 7 is rotated in operation. In the embodiment shown, each of the bats 9 comprises a bat tube 11 with a plurality of fingers 12 attached thereto which extend radially outward from the tube 11, and the shaft 8, at a predetermined angle. The plurality of fingers 12 are spaced in positions along the length of the bat 9, with all of the fingers being arranged at a similar angle in relation to the axis 13 of the bat 11.

The bat tubes 11 are mounted to a plurality of radial support arms 14, extending outwardly from the shaft 8. In this particular case a support plate 15 is shown attaching these radial arms 14 to the shaft 8. The number of radial arms 14 spaced around the shaft 8 will vary dependent upon the number of bats 9 which are used in the particular reel configuration. As well, the number of support plate and radial arm combinations spaced along the length of the shaft would be varied based upon the width of the header and the amount of support required by the reel bats 9.

The bat tubes 11 are rotationally mounted to their radial arms 14, so that they can turn in relation to their axis 13 while remaining attached thereto.

Each of the bat tubes 11 is attached to or includes a crank arm 16, which is attached to the tube 11 in such a way that the inner end of the crank arm 16 will rotate with the tube 11 around the axis 13 of the tube. Each crank arm 16 includes a cam follower 17 and its outer end which is capable of engaging a cam track 18. The cam follower 17 itself has a cam follower axis 19 about which it can rotate. The crank arm 16 is attached to provide the application of rotational force to the tube 11 during the operation of the reel 7.

Many different types of cam followers and corresponding cam track configurations or pairings will be understood. The cam track 18 defines a path around the axis 8 of the reel but is offset from the axis 8 and in this case is non-circular, so that the crank arms 16 will move and they will rotate around their respective bat axis 13 and generate a particular pattern of movement of the fingers 12 attached to that bat 9 as the reel 7 rotates. By changing the shape of the cam track 18 the behavior of the fingers 12 during rotation of the reel 7 can be modified.

In operation when the shaft 8 is rotated the reel 7 will be actuated. As the shaft 8 is rotated, the radial arms 14 will rotate with the bat tubes 11 attached at their ends. Those reel bats 9 will turn in a circle of constant radius defined by the distance between the axis 10 of the shaft 8 and the axis 13 of the reel bats 9. This is the bat path BP. The bat path BP of this particular reel design is shown by dotted circle in this Figure. Overall it will be understood that the behavior of the bats 9 in rotation of the reel 7 in this embodiment and similar embodiments will be that the bats 9 themselves will travel around circular bat path BP and the only change in behavior of the fingers 12 would be generated by the rotation of the tubes 11 of the bats 9 within their rotational attachments on the radial arms 14.

Figure 2:
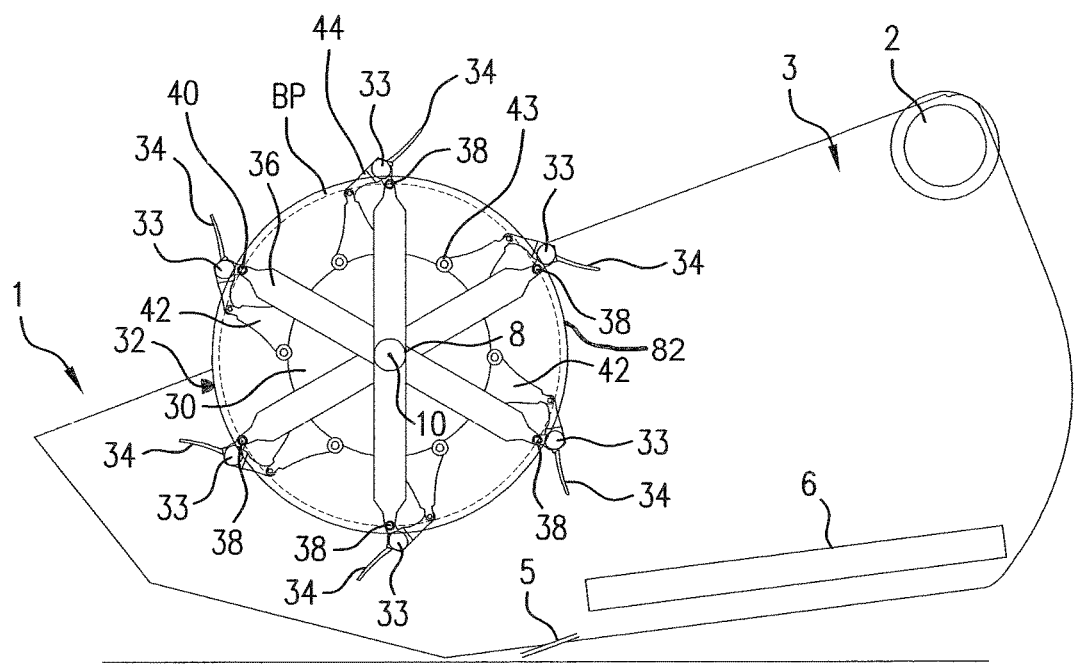
FIG. 2 is a schematic side elevational view of one embodiment of a cam reel and a harvesting header with a complex bat path in accordance with the present invention.
Figure 3:
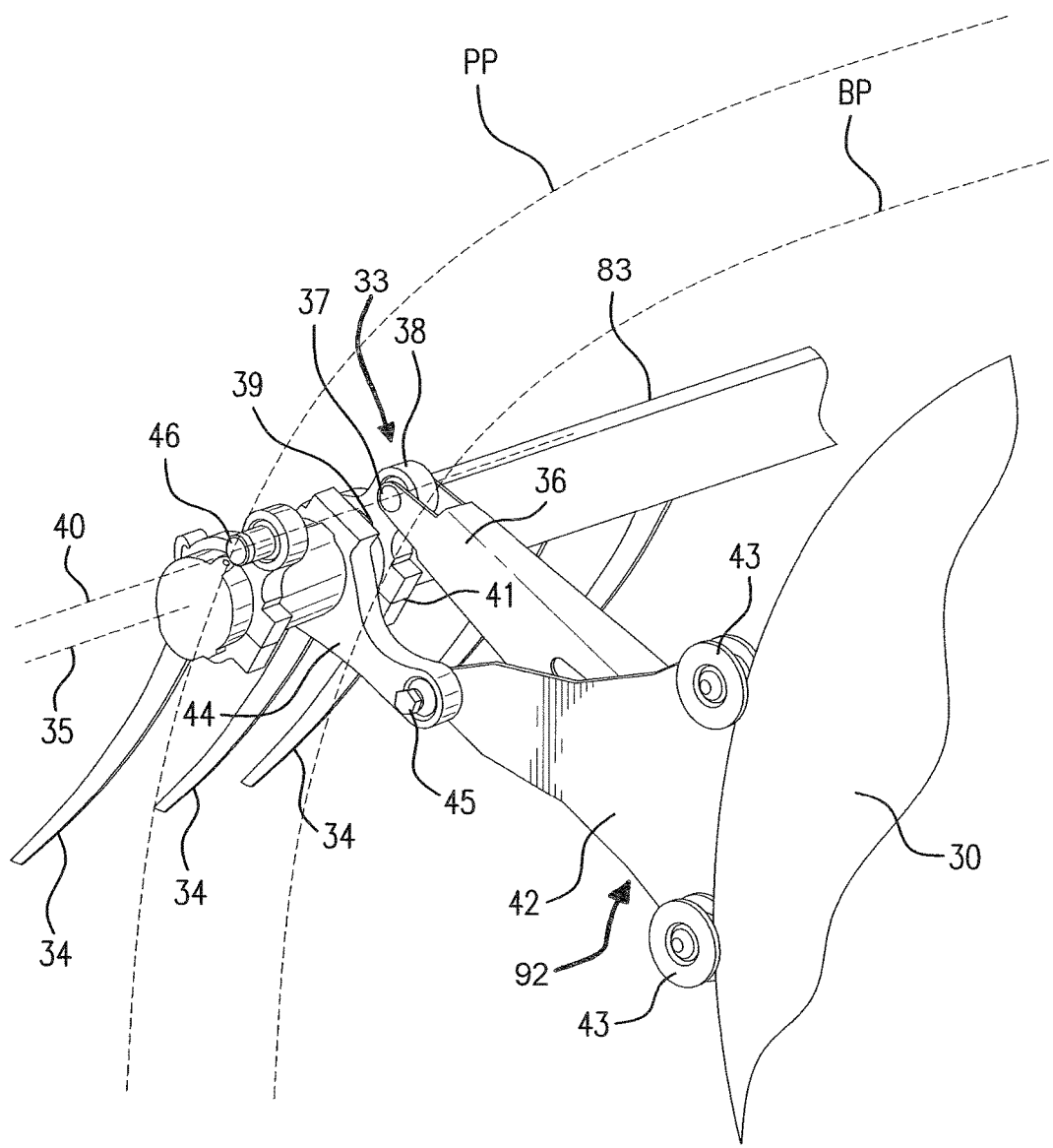
FIG. 3 is a perspective view of the relationship of components in connection of one reel bat to the remainder of the reel, in one embodiment hereof.

Complex Bat Path:

FIGS. 2 and 3 demonstrate one embodiment of the complex bat path configuration of the present invention, over conventional or prior art cam reels for use in harvesting apparatus. FIG. 2 is a schematic side elevational view of one embodiment of a cam reel in accordance with the present invention and harvesting header, taken along an approximate or similar cross-sectional area as the prior art figure shown in FIG. 1. There is shown a header with a frame structure 1 which includes two frame ends 3, and a rear beam 2 in the header. Rather than the auger 6 which is shown in the prior art reel and header combination of FIG. 1, the header shown in FIG. 2 includes a draper conveyor 6. The cutter bar 5 is also shown. The primary difference between the reel of . . . the present invention and that of the prior art in FIG. 1 is the compound connection of the reel bats 33 to the radial arms 36 using bat aims 38, as well as the cam configuration which in combination with the compound connection of the reel bats 33 to the radial arms 36 results in the ability to actually pivot the body of the reel bat 33, being the bat member 83, inside or outside of the circular bat path BP defined by the distal ends of the radial arms 36.

There are shown six radial arms 36 with corresponding reel bats 33 attached thereto. The number of reel bats 33 and corresponding radial arms 36 could vary from reel to reel.

The connection of each radial arm 36 to a reel bat 33 using a bat arm 38, is shown. The pivot axis 40 of the point of attachment of reel bat 33 to its corresponding radial arm 36 can also be seen. There is shown a cam 30 as well as a plurality of cam followers 92 each of which are dual cam followers as described elsewhere herein. The cam 30 which is shown is circular, but it is specifically contemplated that the cam shape used in most embodiments of the invention would be more oblong or kidney shaped—the specific bat path of the reel can be defined or adjusted by shaping and positioning of the cam.

Each of the cam followers 92 is in turn linked to its corresponding reel bat 33 by way of a crank arm 44. In rotation of the reel by turning the shaft 8, the radial arms 36 would rotate with their distal ends, attached to the bat aims 38, describing a circular bat path BP. The cam followers 42 would follow the cam 30 and would exert pivoting power or force, via the pivotal attachment both of the cam follower 92 to the crank arm 44 as well as the . . . pivotal attachment of the reel bat 33 via the bat arm to the radial arm 36, which will allow for the actual arcuate movement of the reel bat 33 around the distal end of the radial arm 36 such that it can move towards or away from, and inside and outside of the circular bat path BP defined by the distal ends of the radial arms 36. Movement of the reel bats 33 towards or away, or inside or outside, of the circular bat path as well as their arcuate movement around the distal ends, will also allow for the movement of the fingers 34 such that the fingers 34 can be aggressively dropped out of the way as they move through the crop material area of the header for example, or can be most rigidly extended to their furthest possible reach as the reel comes around and down into the crop material to move that crop material onto the cutter bar 5. As is shown in the other figures herein, the methodology of the present invention results in the ability to have exaggerated behavior of the fingers and the reel bats in various zones as the reel is turned.

An end pivot stabilizer ring 32 would also be used—it is attached to the frame at the end 3 and allows the ends of the bat members 83 to follow the bat path BP by engaging the ends of the bat members on the pivot axis 40.

FIG. 3 is a partial view of the attachment of one reel bat 33 to the reel of the present invention, and this Figure demonstrates the interaction of the reel bat 33 with the cam lobe 30 and the cam follower 92. The operation of the cam reel of the present invention can be well understood with reference to this Figure.

The first item which is shown is a reel bat 33. The reel bat 33 has the plurality of teeth or fingers 34 attached therealong. The teeth are fixedly attached such that they do not rotate or move around the exterior of the bat member 83. The only means by which the fingers 34 are moved is by the pivoting or movement of the entire reel bat 33 including the rigidly attached fingers 34. The number of reel bats 33 in many agricultural cam reels would be 6 or 8 although the number does not matter insofar as they would be equidistantly spaced around the circumference of the reel shaft.

The reel bat 33 would be attached to the reel shaft 8 by a plurality of radial arms 36 which extend outward from the reel shaft 8. Each reel bat 33 would be attached to a plurality of radial arms 36 being at least 2 and perhaps more depending upon the length and rigidity requirements of the particular reel assembly.

Each radial arm 36 would have at its distal end from the reel shaft 8 a point of pivotal attachment 37, where a bat arm 38 could be attached. The bat arm 38 would have also a bat end 39, to which the bat member 83 would be attached. Various clamps or means of attachment could be used to attach the bat member 83 to the bat arm 38.

Upon pivotal attachment of each bat arm 38 at pivot point 37 to the radial arms 36, the bat arm 38 could pivot about the reel end of the radial arm 36 defining a pivot axis. The pivot axis of the reel bat 33 which is shown is shown in dotted relief at 40. The plane in which the bat arm 38 would pivot about the reel end 37 would be generally perpendicular to the reel axis 10. All of the radial arms 36 for all of the reel bats 33 would generally speaking be the same length and all of the bat arms 38 for all of the reel bats 33 would all be generally the same length.

The reel ends 37 of the radial arms 36 define a circular bat path shown at dotted line BP in this Figure. The reel bat 33 is fixedly attached at the bat end 39 of each bat arm 38 and the reel bat 33 once attached can be pivoted in a plane about the pivot axis 40, parallel to the reel axis 10 in a bat pivot path PP which moves both inside and outside of the radius of the circular bat path BP. Thus when pivoted, the bat axis 35 can move towards or away from the bat path BP.

The next component of the mounting or integration of the reel bat 33 with the remainder of the reel is a first cam 30 which is mounted on the frame 1 perpendicular to the reel axis 10 near the first end of the reel shaft 8. The first cam 30 would be inside of the circular bat path. A partial cut-away portion of the first cam 30 is shown in this Figure.

Each reel bat 33 also has a first cam follower 92 associated therewith. The first cam follower comprises a first link arm 42 and at least one first cam engagement point 43 for engaging the first cam 30.

In this particular case, the first cam 30 is a disc, and there are two cam engagement points 43 being two rollers attached to the first link arm 42 such that they can roll on and follow the edge of the cam disc 30 during rotation of the reel 7. The link arm 42 is attached to its corresponding reel bat 33 by a crank arm 44, so that during rotation of the reel shaft 8, the first link arm 42 will engage and follow the first cam 30 and the corresponding crank arm 44 can pivot the attached reel bat 33 around its pivot axis 40.

By pivoting the reel bat 33 around its pivot axis 40, the bat member 83 and its attached fingers 34 will be moved towards and away from and rotated in relation to the bat path BP as well as the particular radius of the circle described by the bat path BP.

Some embodiments of the reel of the present invention only have a cam 30 and the associated cam follower equipment attached at one end of the reel 7. Many if not most other embodiments of the reel in accordance with the present invention would include another second cam and related second cam follower configuration at the second end of the reel and that is described in further detail elsewhere below.

Also seen in this Figure is the end follower 46 which extends out from the first end of the reel bat 33 along the pivot axis 40 of the bat for engaging the circular first end shield 82. A circular first end shield 82 would be attached to the frame 1 near the first end 3 thereof and around the reel shaft 8. This can be seen in FIGS. 2 and 6. The circular first end shield 82 would define a first bat guide path GP, being generally the same as the circular bat path BP, so that the ends of the reel bats 33 could be retained in a closer or more rigid position to their desired position by the pivotal movement of the end followers 46 through and along that first bat guide path GP. Particularly in light of the compound linkage of the cam followers 92 by the crank arms 44 to the bat members 83, the end pivot stabilization at one or both ends of the reel will be key. On rotation of the reel shaft 8, not shown, the end follower 46 of each reel bat 33 will be engaged in relation to and follow a circular first end shield 82 and the bat guide path GP defined thereby while the first cam follower 92 attached to the reel bat 33 is actuated by the first cam 30 to pivot the reel bat 33 in relation to the pivot axis 40.

Shown in this Figure, the cam 30 is a disc providing a cam path and the cam followers 92 have rollers 43 engaging the disc. In other embodiments the cam 30 could be a component defining a two-sided path, and the cam engagement points 43 could comprise protrusions or other pivotal engagement means to engage that path. Again many different types of cam engagement structures can be contemplated and all are contemplated within the scope of the present invention.

It is specifically contemplated that the cam followers in the reel design of the present invention would be dual cam followers, engaging their respective first or second cam at two cam engagement points 43, so that the link arm 42 of the cam follower 92 would always extend outwards generally perpendicular from the tangent of the lobe of the first or second cam disc which would be defined by or between the two cam engagement points at any given time. This would allow for the most rigid and strongest action by these cam followers as well as for potentially the most aggressive camming behavior by virtue of such rigidity.

Figure 4:
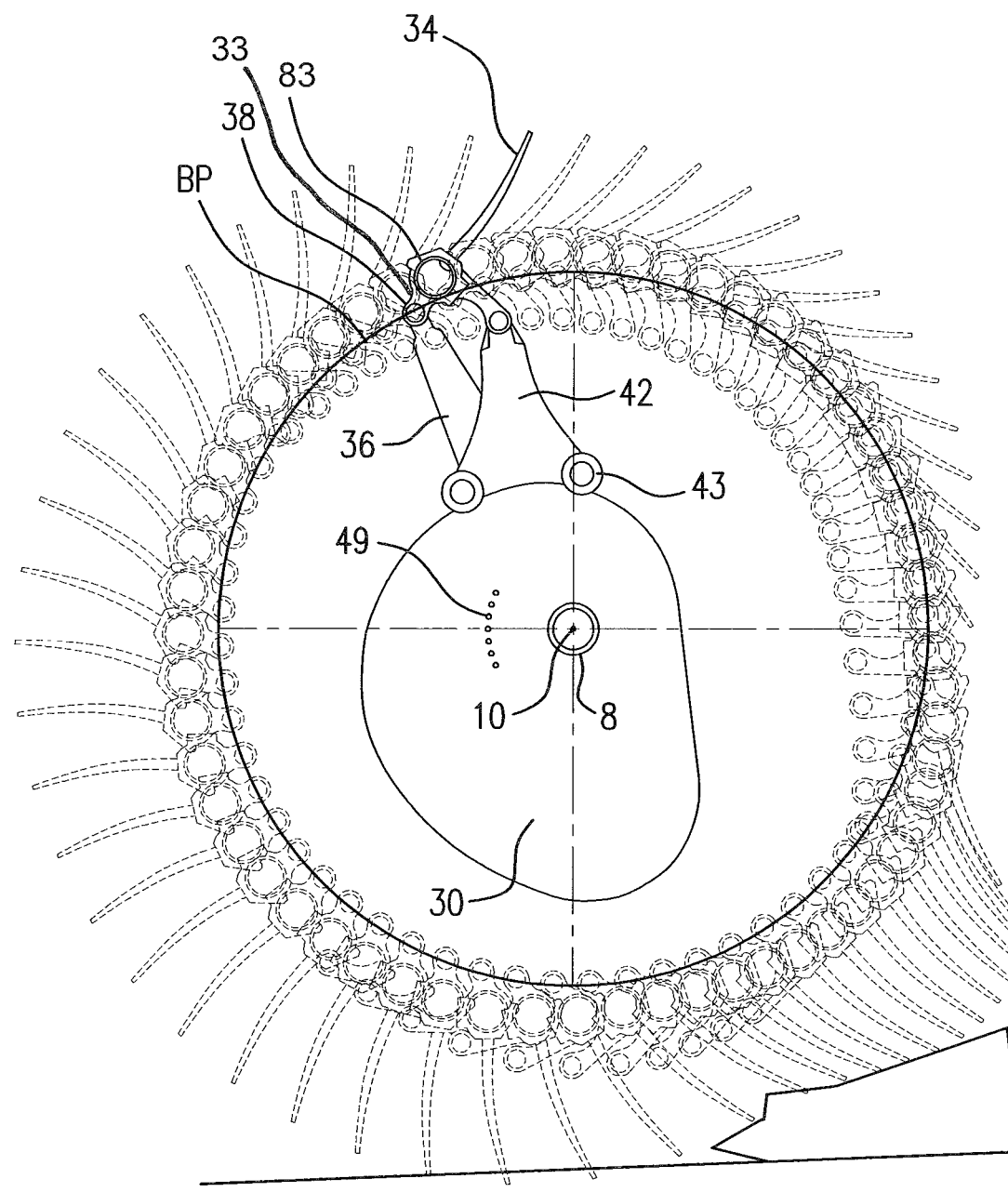
FIG. 4 is a side schematic view demonstrating the bat and finger path in one embodiment of the reel of the present invention.
Figure 5:
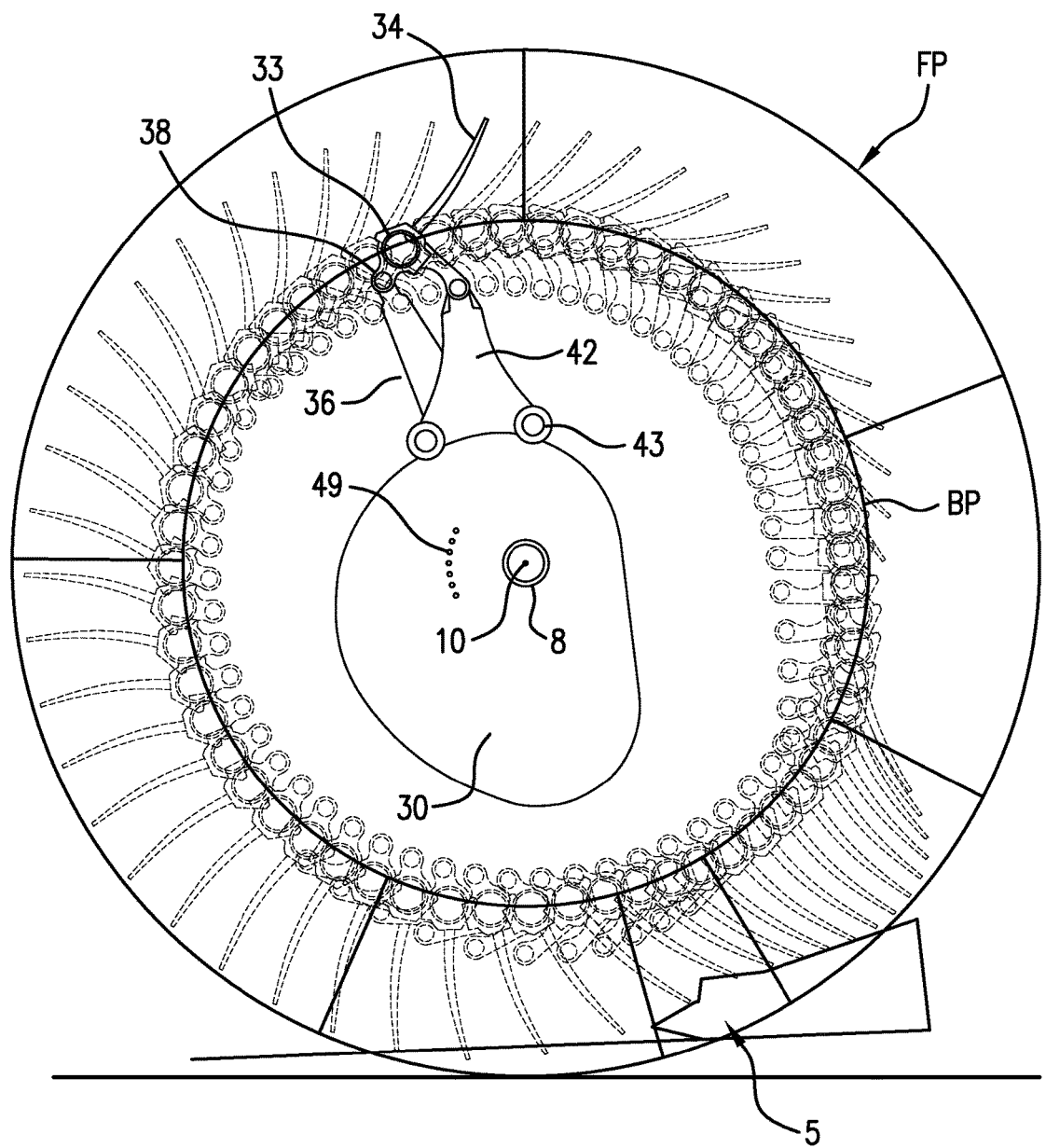
FIG. 5 is an additional view of the bat and finger path shown in FIG. 4.

Referring to FIGS. 4 and 5, the behavior and movement of the fingers 34 is shown in further detail. Each of these Figures demonstrates the path of travel of a single reel bat 33 as the reel is rotated. The movement of the fingers 34 into different activity zones as it passes around the shaft and the reel can be seen—as will be understood, the actual reel when assembled would have a plurality of reel bats 33 and fingers 34 therearound.

Referring first to FIG. 4, the bat path is shown as circle BP. The bat path BP is the circular path defined by the reel ends 37 of the radial arms 36 which hold the reel bats 33 in position around the shaft 8. The bat path BP is circular. The travel of the finger 34 and its associated bat member 83 and bat components as the reel is rotated is shown. The cam 30 is shown in the center of the Figure, mounted around the reel axis 10 of the shaft 8 and the reel. The outreach of the fingers 34 to their furthest reach as they reach the front of the reel in its rotation and they reach out into the crop material to rake it up off of the crop field and into the cutter bar is shown. As the cam 30 cooperates with the cam followers 92 and the remainder of the components it can then be seen that the fingers effectively "fall away" as the cut crop material is deposited on the draper conveyor 6 and the reel bat 33 returns to the top of the circle to reach out again to reach into the crop material.

Also shown is the actual movement of the reel bat 33 itself in relation to the bat path BP. It can be seen that the reel bat 33 itself moves towards and away from the bat path BP by operation of its particular linkage via the cam follower link arm 42 and crank arm 44 etcetera. The entire reel bat 33 pivots around the pivot axis 40, at the end of the bat arms 39, rather than simply having the reel bat 33 rotate in a bearing or the like in fixed location along the bat path BP. This results in the ability to provide more aggressive grabbing behavior for the fingers 34 and their associated reel bats as well as to swing them further out of the way when it is desired to not have the fingers 34 interfere such as when they are cycling up through the draper area of the header.

Referring to FIG. 5 there is shown another iteration of the same figure, which in addition to demonstrating the bat path BP also shows the extreme reach of the fingers 34, shown in path FP. The extreme reach of the fingers 34 is used only, as can be seen, as the fingers 34 descend towards the field surface and approach the cutter bar 5. As the fingers 34 cycle up through the draper area of the header and around the top of the reel, they are not extended at all to their extreme reach or to position FP. Again, position FP has as its axis the center of the reel shaft 8, but by virtue of the operation of the particular linkage of the present invention, the reach of the fingers 34, shown at FP, is further from the axis 10 than it would be if the reel bats 33 were conventionally mounted such as in the embodiment of the prior art shown in FIG. 1.

The cam 30 as is shown in some of the Figures has a plurality of predetermined working positions and is adjustable. What is shown is a series of holes 49 which would presumably use a pin or other type of a lock to hold the cam in position once the proper predetermined working position had been selected. This would allow for the modest adjustment of the working behavior of the reel and the fingers 34, dependent upon the setting which was chosen—referencing FIG. 5, adjustment of the predetermined working position of the cam might also result in the contraction or extension of the radius of circle FP.

As is outlined in detail in several locations herein, the reel of the present invention could have cam 30 and end pivot stabilizer hardware 32 at one or both ends thereof. If there was a cam 30 at only one end of the reel, it could simply be made adjustable between a number of predetermined working positions. If there was a cam 30 at each end of the reel, it would need to be mounted in a mirrored fashion, so that mirrored cam force would be exerted on the reel as it was rotated. If the cams 30 were not mirrored, inappropriate or imbalanced torsional force could be exerted upon the reel and it could be damaged or broken.

Adjustable Cam Position:

One of the added functional benefits of the cam reel of the present invention as outlined herein is the adjustable working positions of the cam, as are outlined. The cam 30 which is shown in FIGS. 4 and 5 is adjustable between a plurality of predetermined working positions. This is done by virtue of the fact that the first or second cam 30 itself is rotatably mounted to the frame 3 around the axis 10 of the reel shaft 8. The cam 30 can then be rotated around the reel shaft 8 by releasing a locking pin or other locking mechanism from the selected locking hole 49 which is shown, adjusting the cam 30 into the desired new locking working position, and relocking the cam 30 in that position in relation to the frame and the reel. In a circumstance where there are cams 30 at both ends of the reel, cams 30 at both ends would need to be adjusted. Providing the ability to adjust the first cam 30 or the second cam between a plurality of predetermined working positions like this provides for a degree of flexibility and operation of the device by the operator, if they wished to for example make the behavior of the reel more or less aggressive for some reason by a slight rotation of the cams, or for example making a slight adjustment to lift the fingers 34 up higher over the cutter bar 5 etcetera. There would only be limited adjustment available with this type of an approach, but it is contemplated that this would be a desirable added benefit to provide for users.

Single or Double Cam Configurations:

Depending upon the width of the overall header and the reel, the weight of the unit, the strength of the unit or the crop being cut, etcetera, it may be the case that either a single cam 30 would be used at one end of the frame and one end of the reel, or in other circumstances two cams would be used at either end of the reel and the frame 3. Both such approaches are contemplated within the scope of the present admission. In embodiments of the crop harvesting header or the reel of the present invention that used only a single cam, there would be a first cam 30 mounted on the frame, generally perpendicular to the reel axis 10 near the first end of the reel shaft 8. The first cam 30 would be inside of the circular bat path BP. There would be then a relative set of first cam followers corresponding to each reel bat, each comprising a first link arm having at least one first cam engagement point for engaging the first cam 30. The first link arm would be attached at its corresponding reel bat by a crank or arm, so that during rotation of the reel shaft each first cam follower would engage and follow the first cam 30 and the corresponding crank arm could pivot the attached reel bat around its pivot axis.

In a dual cam configuration of the reel of the present invention, there would be a second cam 30 mounted on the frame at a mirrored position on the frame 3 to the attachment of a first cam at the first end thereof, again perpendicular to the reel axis 10 near the second end of the reel shaft 8. The second cam would be inside of the circular bat path BP also and be a mirrored shape of the first cam. It would be essential for the first cam and the second cam to be mirrored shapes of each other and to be in mirrored positions on either end of the header, to avoid inappropriate torsional force being exerted upon the reel during operation.

In respect of the second cam, there would be a second set of cam followers, being second cam followers corresponding to each reel bat, each of which would comprise a second link arm and at least one second cam engagement point for engaging the second cam. A second link arm would be attached to its corresponding reel bat by a second crank arm so that during rotation of the reel shaft the second cam follower would engage and follow the second cam and the corresponding second crank arm could pivot the attached reel bat around its pivot axis.

In addition to either a single or dual cam configuration for the reel of the present invention, the reel of the present invention might also have either only a first end pivot stabilizer at the first end thereof, or may also have a second end pivot stabilizer at the second end thereof, to maintain the reel bats 33 in approximately the correct position by engaging the end followers extending out from the ends of each reel bat or on the pivot axis of each bat for the purpose of engagement of the corresponding circular end shield and the bat guide path. Either the first end pivot stabilizer or the second end pivot stabilizer would comprise a circular end shield, being a circular first end shield or a circular second end shield, attached to the frame about the reel shaft 8 around the outside of the corresponding cam, being a first or second cam, and defining a bat guide path which is generally the same as the circular bat path. There would be then a second end follower extending out from the second end of the reel bats, in the case of a second end pivot stabilizer, or a first end follower extending out from the first end to the reel bats in the case of a first end pivot stabilizer, which would comprise a follower extending outward along the pivot access of the bat for engaging the circular end shield corresponding to that end of the reel. These end path stabilizers would hold the reel bats 33 in approximately appropriate position in relation to the circular bat path while the reel was operated. This would be particularly important in light of the strong power and aggressive camming behavior which is enabled by the cam configuration of the present invention.

As outlined above in respect of either of the first cam or the second cam, the corresponding first cam followers and second cam followers could be single or dual cam followers. It is specifically contemplated that it would most likely be the case that dual cam followers, namely cam followers having two cam engagement points such that they always extended outwards perpendicular from the tangent of a lobe of the came defined by those two cam engagement points at any given time, would be the preferable approach.

Figure 6:
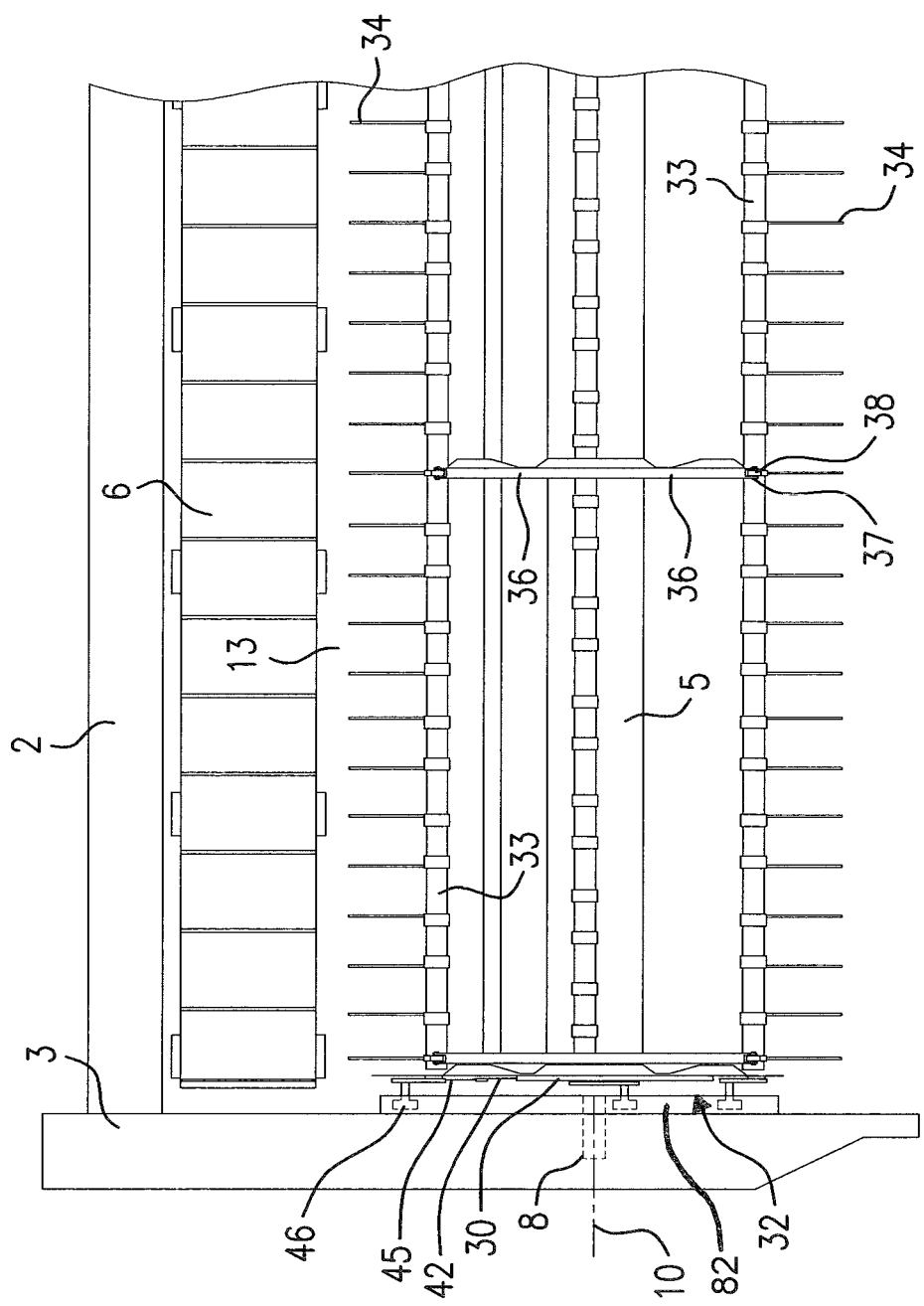
FIG. 6 is a top plan view of one end of the cam reel and header combination of FIG. 2.

FIG. 6 for demonstrative purposes is a top plan view of one end of the cam reel and header combination of FIG. 2—it is simply intended to provide some idea of the behavior of the various components in terms of their engagement between the reel and the frame.

Reel Assembly:

In addition to a harvesting header including the cam reel with a complex bat path of the present invention, the invention also comprises the cam reel itself with the necessary mounting hardware to the frame of a header, so that the reel could be interchangeably attached to a pre-existing header frame. By manufacturing the reel itself of the present invention of the correct width, by providing interchangeable and mounting hardware which would include the cam or cams 30 for frame mounting as well as the end pivot stabilizers 32 which are also attached to the frame, it would be possible to retrofit a pre-existing harvesting header frame with the cam reel of the present invention. The creation of one or more interchangeable end kits would allow for an aftermarket parts or sales operation to sell a cam reel in accordance with the present invention of approximately the correct length, with the necessary mounting hardware to attach it to a frame and rotatably mount the reel shaft to the rotatable power source, so the pre-existing header or crop cutting device could be retrofitted with the functionality of the present invention.

As outlined above, in addition to the cam reel in accordance with the present invention of approximately the right width for mounting across the transverse conveyor deck and the width of a frame of a header, the primary frame mounted hardware which would be required to be attached for the operation of the cam reel of the present invention would be the at least one cam 30 for mounting out one or both ends of the reel, dependent upon the width of the reel, as well as the end pivot stabilizer 32 or stabilizers for mounting at one or both ends of the reel to the frame 1 to retain the reel bats 33 of the reel in their appropriate positions as they were cammed or rotated by the activity of the cam followers following the cam in the rotation of the reel.

The reel in this patent would as outlined elsewhere herein be attached in this retrofit context to a preexisting frame. There would be rotational bearing or attachment points at each end 3 of the frame 1 which would adapt or accommodate the attachment of the reel.

Figure 7:
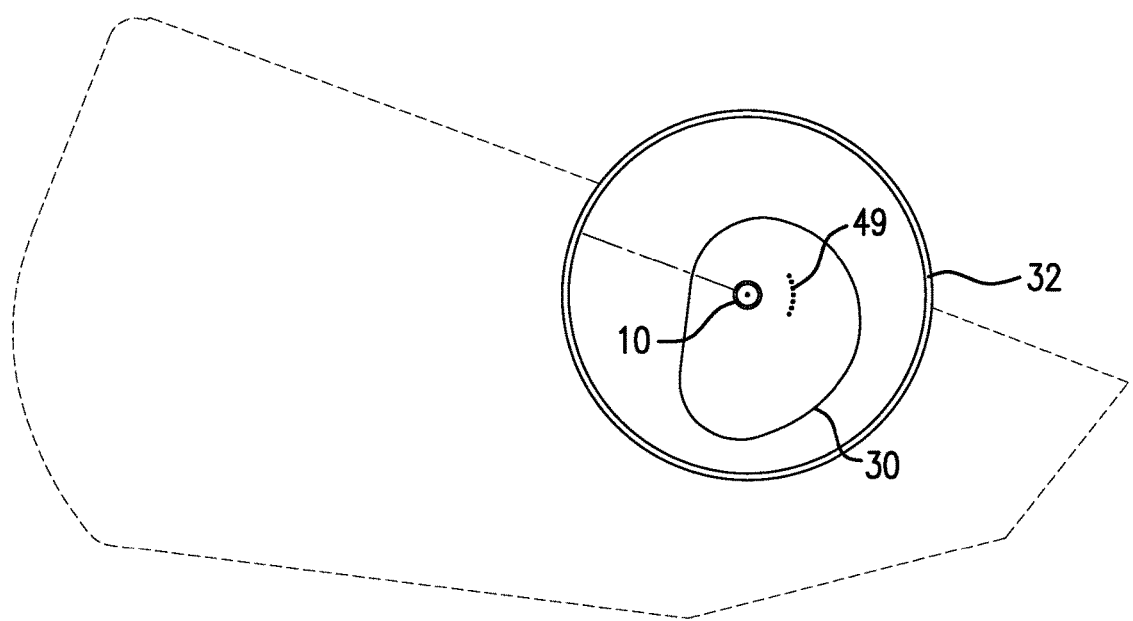
FIG. 7 is a side view of one embodiment of the combination of the cam and end pivot stabilizer.

Referring to FIG. 7 there is shown 1 view of a cam 30 and an end pivot stabilizer 32 for mounting to the end 3 of a frame for attachment and operation of the reel. The frame 1 is shown in dotted relief behind these components.

It will be understood that the end pivot stabilizer 32 and the cam 30 could be attached using standard bolts or other hardware—the manufacturer of the reel and the interchangeable end components might manufacture these end components 30 and 32 with the necessary appropriate mounting hardware or mounting holes for the mounting of these components onto a particular frame 1. For a particular header 1 and frame end 3, it may also be the case that the cam 30 itself would be changed, to provide for different camming behavior of the reel bats in a particular assembled header. It may be necessary for example for the cam path to be adjusted so that the reel bats will avoid the cutting bar 5 matter in a particular embodiment of a header etcetera. It is not contemplated that the cam 30 would be adjustable in its path in position but the cam path could be adjusted by changing the cam 30.

Also shown at 49 are a plurality of preselected positioning holes, through which the cam 30 could be rotatably locked in position. As outlined elsewhere herein, by the rotational attachment of the cam 30 around the central axis 10, such that it could rotate, rotation of the cam 30 and locking the cam 30 in a particular preset position by using the locking pinholes 49 or whatever other similar locking device was used in a particular embodiment, this would again allow for some modest adjustment of the behavior of the reel bats in the reel. Where a cam 30 was attached at both ends 30 of the frame 1, it would be necessary that these cams 30 mirrored each other, so that the same torsional force would be applied to the reel bats 33 at each end as their respective cam followers applied force thereto. Adjustment of a cam 30 at one end of the frame 1 would occasion a mirrored adjustment at the other end in order for the reel to not bind and to properly operate.

In some embodiments, the cam 30 and the end pivot stabilizer 32 could be manufactured as a single component, namely a single plate with two paths defined thereon, or in other circumstances it may be desirable for the cam 30 and the end pivot stabilizer 32 to be 2 independently mounted components. Both such approaches are contemplated within the scope of the present invention.

The end pivot stabilizers 32 and the cams 30, along with necessary bolts or hardware, are contemplated to be the key components of interchangeable end kits which might be used to interchangeably fit the reel assembly of the present invention to different headers.

The specific nature of the cam path which is defined around the circumference of the cam 30 or the end pivot stabilizer insofar as it will stabilize the reel bats of the reel, could take many forms again dependent upon the type and configuration of the mating components on the reel bats themselves or the cam 30. All such modifications are again contemplated within the scope of the present invention. In the retrofit of a preexisting header with the reel assembly of the present invention, the appropriate end kits being the appropriate end pivot stabilizers 32 and cams 30 could be mounted in the proper position in relation to the central axis 10 of the reel shaft mounting, and a reel in accordance with the present invention could then be mounted to the frames at the rotational attachment points in the center thereof, with the cam followers and the end pivot stabilization points engaging their respective end components at each end.

It will be apparent to those of skill in the art that by modification the present invention can be optimized for use in a wide range of conditions and applications, and in particular for different types of crops and various models of combine. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A crop harvesting header comprising: a reel operable to be rotated about a reel axis, said reel comprising:
   (i) at least one radial arm extending generally radially outward from a reel shaft that is aligned with said reel axis, and said at least one radial arm operable for rotation about said reel axis with said reel shaft;
   (ii) at least one reel bat supported by said at least one radial arm, said at least one reel bat operable for rotation with said radial arm about said reel axis, the at least one reel bat also being operable for pivoting movement about a bat pivot axis radially spaced from said reel axis and oriented generally parallel to the reel axis;
   (iii) a reel bat pivoting mechanism operable to cause pivoting movement of said at least one reel bat about said bat pivot axis;

said at least one reel bat having a longitudinally extending bat member oriented in generally parallel relation to said bat pivot axis, with at least one crop finger connected to said bat member, said at least one crop finger extending generally away from said bat member;

the at least one reel bat having a bat arm extending generally orthogonal to said bat pivot axis and being connected to said bat member, said bat arm operable for pivoting movement with said bat member about said bat pivot axis;

said bat arm of said at least one reel bat being pivotally connected at a bat arm connection location to said at least one radial arm to allow for pivoting movement of said bat arm and said bat member about said bat pivot axis relative to said radial arm, during rotation of said reel about said reel axis;

the movement of said bat arm connection location defining a defined circular path, when in operation said reel rotates with said at least one reel bat about said reel axis;

the bat member being operable to be pivoted at said bat arm connection location about its bat pivot axis by pivoting movement of said bat arm relative to said radial arm so that in operation, the angle of the at least one crop finger about the bat pivot axis is varied, during rotation of the reel about the reel axis;

said bat arm, said radial arm and said bat member being configured such that in operation, during rotation of said reel about said reel axis, as said reel bat pivoting mechanism causes pivoting movement of said bat arm and said bat member of said at least one reel bat about said bat pivot axis, said bat member moves in a bat pivot path that extends towards and away from said defined circular path;

wherein said reel bat pivoting mechanism comprises:
   a path defining apparatus defining a non-circular path, said path surrounding said reel axis;
   an interconnecting mechanism comprising: (I) a first portion operable for movement along said non-circular path and (II) a second portion interconnecting said first portion and said at least one reel bat;

such that in operation, rotation of said reel around said reel axis, causes said first portion of said interconnecting mechanism to move along said non-circular path to cause said interconnecting mechanism to pivot said at least one bat about said bat pivot axis.

2. A header as claimed in claim 1 wherein said bat arm, said radial arm and said bat member are configured such that in operation, during rotation of said reel about said reel axis, as said reel bat pivoting mechanism causes pivoting movement of said bat arm and said bat member of said at least one reel bat about said bat pivot axis, said bat member moves in a bat pivot path that extends between a first position that is radially outward of said defined circular path and a second position that is radially inward of said defined circular path.

3. A header as claimed in claim 2 wherein said header further comprises a frame configured to support said reel in rotation about said reel axis, and wherein said reel bat pivoting mechanism comprises a cam mechanism comprising:
   a cam mounted in fixed relation to said frame, said cam having a cam track which surrounds said reel axis and defines said non-circular path;
   wherein said interconnecting mechanism comprises a cam follower mechanism comprising: (I) a cam follower interconnected with a link arm, said cam follower engageable for movement along said cam track around said reel axis; (II) a crank arm connected to said link arm proximate a first end of said link arm, and said crank arm interconnected to said at least one reel bat; such that in operation, rotation of said at least one reel around said reel axis, causes said cam follower to move along said cam track, the path of the cam track being operable to cause said link arm to transmit a force to said crank arm causing said crank arm to pivot about said bat pivot axis.

4. A header as claimed in claim 1 wherein said header further comprises a frame configured to support said reel in rotation about said reel axis, and wherein said reel bat pivoting mechanism comprises a cam mechanism comprising:
a cam mounted in fixed relation to said frame, said cam having a cam track which surrounds said reel axis and defines said non-circular path;
wherein said interconnecting mechanism comprises a cam follower mechanism comprising: (I) a cam follower interconnected with a link arm, said cam follower engageable for movement along said cam track around said reel axis; (II) a crank arm connected to said link arm proximate a first end of said link arm, and said crank arm interconnected to said at least one reel bat; such that in operation, rotation of said reel around said reel axis, causes said cam follower to move along said cam track, the path of the cam track being operable to cause said link arm to transmit a force to said crank arm causing said crank arm to pivot about said bat pivot axis.

5. A header as claimed in claim 1 further comprising:
a frame configured to support said reel in rotation about said reel axis, said frame having two reel ends;
a conveyor extending between the reel ends of the frame, the conveyor operable to move cut crop material to a header discharge;
a cutter bar assembly mounted to said frame along a forward edge portion of the conveyor, said cutter bar assembly having a cutting system operable to cut crop material engaged by the header.

6. A header as claimed in claim 1 further comprising a rotational power system operable to rotate the reel about said reel axis.

7. A header as claimed in claim 1 further comprising:
(a) a frame operable to support said reel in rotation about said reel axis;
(b) an end pivot stabilizer, said end pivot stabilizer comprising:
a circular end shield attached to the frame and located proximate an end of said reel said end shield having a bat guide path that provides a path that is generally aligned with said defined circular path; and
an end follower extending out from a first end of said a least one reel bat and being longitudinally aligned with the pivot axis of the bat for engaging the circular first end shield.

8. A header as claimed in claim 1 wherein said non-circular path is generally oblong shaped.

9. A header as claimed in claim 1 wherein said non-circular path is generally kidney shaped.

10. A header as claimed in claim 1 wherein said non-circular path is generally asymmetrically oval in shape with a forward facing side of said non-circular path extending outward more than a rearward facing side of non-circular path.

11. A header as claimed in claim 1 wherein said non-circular path protrudes outwards from the reel axis on a frontward facing side of the reel more than it protrudes from the reel axis on a rearward facing side of the reel.

12. A header as claimed in claim 1 wherein said header may be configured such that said at least one finger has an outreach orientation that provides for a greatest radial outward extension, and wherein said non-circular path is generally configured to provide said greatest radial outward extension of said at least one finger when said at least one finger is at an angular rotational position about said reel axis that corresponds to a front area of the reel.

13. A header as claimed in claim 12 wherein said header further comprises a cutting apparatus and wherein said non-circular path is generally configured to provide said greatest radial outward extension of said at least one finger when said at least one finger is at an angular rotational position about said reel axis that corresponds to a front area of the reel so as to be operable to rake crop material into said cutting apparatus.

14. A header as claimed in claim 1 wherein said header may be configured such that said at least one finger has an outreach orientation that provides for a smallest radial outward extension and wherein said non-circular path is generally configured to provide said smallest radial outward extension of said at least one finger when said at least one finger is at an angular rotational position about said reel axis that corresponds to a rear area of the reel.

15. A header as claimed in claim 14 wherein said header further comprises a crop conveying apparatus located proximate said rear area of the reel, and wherein said non-circular path is generally configured to provide said smallest radial outward extension of said at least one finger when said at least one finger is at an angular rotational position about said reel axis that corresponds to a rear area of the reel so as to be operable to assist cut crop material to be deposited onto said crop conveying apparatus.

16. A header as claimed in claim 15 wherein said header may be configured such that said at least one finger has an outreach orientation that provides for a greatest radial outward extension, and wherein said non-circular path is generally configured to provide said greatest radial outward extension of said at least one finger when said at least one finger is at an angular rotational position about said reel axis that corresponds to a front area of the reel.

17. A header as claimed in claim 16 wherein said header further comprises a crop cutting apparatus positioned in front of said crop conveying apparatus and wherein said non-circular path is generally configured to provide said greatest radial outward extension of said at least one finger when said at least one finger is at an angular rotational position about said reel axis that corresponds to a front area of the reel so as to be operable to rake crop material into said crop cutting apparatus.

18. A crop harvesting header comprising: a reel operable to be rotated about a reel axis, said reel comprising:
(i) a plurality of radial arms extending generally radially outward from a reel shaft that is aligned with said reel axis, and said plurality of radial arms operable for rotation in synchronized movement about said reel axis;
(ii) a plurality of reel bats, each reel bat of said plurality of reels bats supported by at least one radial arm of said plurality of radial arms, each reel bat of said plurality of reel bats being operable for rotation with said at least one radial arm about said reel axis, each reel bat of said plurality of reel bats also being operable for pivoting movement about a respective bat pivot axis of a plurality of bat pivot axes, said plurality of bat pivot axes being radially spaced from said reel axis and angularly spaced from each other about said reel axis, and oriented generally parallel to the reel axis;

(iii) a reel bat pivoting mechanism operable to cause pivoting movement of each reel bat of said plurality of reel bats about said respective bat pivot axis;

each reel bat of said plurality of reel bats having a longitudinally extending bat member oriented in generally parallel relation to said respective bat pivot axis, with at least one crop finger connected to each said bat member, said at least one crop finger extending generally away from said respective bat member;

each reel bat of said plurality of reel bats having a bat arm extending generally orthogonal to said respective bat pivot axis and being connected to said respective bat member, each said bat arm operable for pivoting movement with said respective bat member about said respective bat pivot axis;

said bat arm of each said reel bat of said plurality of reel bats having a distal end portion that is pivotally connected at a respective bat arm connection location proximate an end portion of said at least one radial arm to allow of pivoting movement of each said bat arm and said bat member of each said reel bat about said respective bat pivot axis relative to said respective radial arm, during rotation of said reel about said reel axis;

the movement of each said respective bat arm connection location defining a defined circular path, when in operation said reel rotates with said at least one reel bat about said reel axis;

the bat member of each reel bat of said plurality of reel bats being operable to be pivoted at said bat arm connection location about its respective bat pivot axis by pivoting movement of each said bat arm relative to said respective radial arm so that in operation, the angle of the at least one crop finger about the respective bat pivot axis is varied, during rotation of the reel about the reel axis;

each said bat arm, said radial arm and said bat member of each reel bat of said plurality of reel bats being configured such that in operation, during rotation of said reel about said reel axis, as said reel bat pivoting mechanism causes pivoting movement of each said bat arm and each respective said bat member of each reel bat about said respective bat pivot axis, each said bat member moves in a respective bat pivot path that extends towards and away from defined circular path;

wherein said reel bat pivoting mechanism comprises:
 a path defining apparatus defining a non-circular path, said path surrounding said reel axis;
 a plurality of interconnecting mechanisms each interconnecting mechanism comprising: (I) a first portion operable for movement along said non-circular path; and (II) a second portion interconnecting said first portion and said plurality of reel bats;
such that in operation, rotation of said reel around said reel axis, causes said first portion of each said interconnecting mechanism to move along said path to cause each said interconnecting mechanism to transmit a force to pivot each bat of said plurality of bats about said respective bat pivot axis.

19. A header as claimed in claim 18 further comprising a rotational power system operable to rotate the reel about said reel axis.

20. A crop harvesting header comprising: a reel operable to be rotated about a reel axis, said reel comprising:

(i) a bat support extending generally radially outward relative to a reel shaft that is aligned with said reel axis, and said bat support operable for rotation about said reel axis;

(ii) a reel bat supported by said bat support, said reel bat operable for rotation with said bat support about said reel axis, the reel bat also being operable for pivoting movement about a bat pivot axis radially spaced from said reel axis and oriented generally parallel to the reel axis;

(iii) a reel bat pivoting mechanism operable to cause pivoting movement of said reel bat about said bat pivot axis;

said reel bat having a longitudinally extending bat member oriented in generally parallel relation to said bat pivot axis, with at least one crop finger connected to said bat member, said at least one crop finger extending generally away from said bat member;

the reel bat having a bat link extending away from said bat pivot axis and being fixedly connected to said bat member, said bat link operable for pivoting movement with said bat member about said bat pivot axis;

said bat link of said reel bat being pivotally inter-connected at a bat link connection location to said bat support to allow for pivoting movement of said bat link and said bat member about said bat pivot axis relative to said bat support, during rotation of said reel about said reel axis;

the movement of said bat link connection location defining a defined circular path, when in operation said reel rotates with said reel bat about said reel axis;

the bat member being operable to be pivoted at said bat link connection location about its bat pivot axis by pivoting movement of said bat link relative to said bat support so that in operation, the angle of the at least one crop finger about the bat pivot axis is varied, during rotation of the reel about the reel axis;

said bat link, said bat support and said bat member being configured such that in operation, during rotation of said reel about said reel axis, as said reel bat pivoting mechanism causes pivoting movement of said bat arm and said bat member of said bat about said bat pivot axis, said bat member moves in a bat pivot path that extends towards and away relative to said defined circular path;

wherein said reel bat pivoting mechanism comprises:
 a path defining apparatus defining a non-circular path, said non-circular path surrounding said reel axis;
 an interconnecting mechanism comprising: (I) a first portion operable for movement along said non-circular path (II) a second portion fixedly connected to said at least one reel bat;
such that in operation, rotation of said reel around said reel axis, causes said first portion of said interconnecting mechanism to move along said path to cause said interconnecting mechanism to pivot said bat about said bat pivot axis.

21. A header as claimed in claim 20 wherein said non-circular path is generally oblong shaped.

22. A header as claimed in claim 20 wherein said non-circular path is generally kidney shaped.

23. A header as claimed in claim 20 wherein said non-circular path is generally an asymmetrical oval in shape with a forward facing side of said non-circular path extending outward more than a rearward facing side of non-circular path.

24. A header as claimed in claim 20 wherein said non-circular path protrudes outwards from the reel axis on a frontward facing side of the reel more than it protrudes from the reel axis on a rearward facing side of the reel.

25. A header as claimed in claim 20 wherein said header may be configured such that said at least one finger has an outreach orientation that provides for a greatest radial outward extension, and wherein said non-circular path is generally configured to provide said greatest radial outward extension of said at least one finger when said at least one finger is at an angular rotational position about said reel axis that corresponds to a front area of the reel.

26. A header as claimed in claim 25 wherein said header further comprises a cutting apparatus and wherein said non-circular path is generally configured to provide said greatest radial outward extension of said at least one finger when said at least one finger is at an angular rotational position about said reel axis that corresponds to a front area of the reel so as to be operable to rake crop material into said cutting apparatus.

27. A header as claimed in claim 26 wherein said header further comprises a crop conveying apparatus located proximate said rear area of the reel, and wherein said non-circular path is generally configured to provide said smallest radial outward extension of said at least one finger when said at least one finger is at an angular rotational position about said reel axis that corresponds to a rear area of the reel so as to be operable to assist cut crop material to be deposited onto said crop conveying apparatus.

28. A header as claimed in claim 27 wherein said crop conveying apparatus is a draper apparatus.

29. A header as claimed in claim 27 wherein said header may be configured such that said at least one finger has an outreach orientation that provides for a greatest radial outward extension, and wherein said non-circular path is generally configured to provide said greatest radial outward extension of said at least one finger when said at least one finger is at an angular rotational position about said reel axis that corresponds to a front area of the reel.

30. A header as claimed in claim 29 wherein said header further comprises a crop cutting apparatus positioned in front of said crop conveying apparatus and wherein said non-circular path is generally configured to provide said greatest radial outward extension of said at least one finger when said at least one finger is at an angular rotational position about said reel axis that corresponds to a front area of the reel so as to be operable to rake crop material into said crop cutting apparatus.

31. A header as claimed in claim 20 wherein said may be configured such that said at least one finger has an outreach orientation that provides for a smallest radial outward extension and wherein said non-circular path is generally configured to provide said smallest radial outward extension of said at least one finger when said at least one finger is at an angular rotational position about said reel axis that corresponds to a rear area of the reel.

32. A header as claimed in claim 20 further comprising a rotational power system operable to rotate the reel about said reel axis.

33. A crop harvesting header comprising: a reel operable to be rotated about a reel axis, said reel comprising:
  (i) at least one radial arm extending generally radially outward from a reel shaft that is aligned with said reel axis, and said at least one radial arm operable for rotation about said reel axis;
  (ii) at least one reel bat supported by said at least one radial arm, said at least one reel bat operable for rotation with said radial arm about said reel axis, the at least one reel bat also being operable for pivoting movement about a bat pivot axis radially spaced from said reel axis and oriented generally parallel to the reel axis;
  (iii) a reel bat pivoting mechanism operable to cause pivoting movement of said at least one reel bat about said bat pivot axis;
said at least one reel bat having a longitudinally extending bat member oriented in generally parallel relation to said bat pivot axis, with at least one crop finger connected to said bat member, said at least one crop finger extending generally away from said bat member;
the at least one reel bat having a bat arm extending generally orthogonal to said bat pivot axis and being connected to said bat member, said bat arm operable for pivoting movement with said bat member about said bat pivot axis;
said bat arm of said at least one reel bat being pivotally connected at a bat arm connection location to said at least one radial arm to allow for pivoting movement of said bat arm and said bat member about said bat pivot axis relative to said radial arm, during rotation of said reel about said reel axis;
the movement of said bat arm connection location defining a defined circular path, when in operation said reel rotates with said at least one reel bat about said reel axis;
the bat member being operable to be pivoted at said bat arm connection location about its bat pivot axis by pivoting movement of said bat arm relative to said radial arm so that in operation, the angle of the at least one crop finger about the bat pivot axis is varied, during rotation of the reel about the reel axis;
said bat arm, said radial arm and said bat member being configured such that in operation, during rotation of said reel about said reel axis, as said reel bat pivoting mechanism causes pivoting movement of said bat arm and said bat member of said at least one reel bat about said bat pivot axis, said bat member moves in a bat pivot path that extends towards and away from said defined circular path;
wherein said header further comprises a frame configured to support said reel in rotation about said reel axis, and wherein said reel bat pivoting mechanism comprises a cam mechanism comprising:
  a cam mounted in fixed relation to said frame, said cam having a cam track which surrounds said reel axis and which defines a non-circular path;
  a cam follower mechanism comprising: (I) a cam follower interconnected with a link arm, said cam follower engageable for movement along said cam track around said reel axis; (II) a crank arm connected to said link arm, and said crank arm interconnected to said at least one reel bat;
such that in operation, rotation of said reel around said reel axis, causes said cam follower to move along said cam track in a non-circular path, the non-circular path of the cam track being operable to cause said link arm to transmit a force to said crank arm causing said crank arm to pivot said bat member about said bat pivot axis.

34. The header of claim 33 wherein the cam is adjustable between a plurality of predetermined working positions.

35. The header of claim 33 wherein said cam follower comprises is a dual first cam follower, operable to engage the cam at two first cam engagement locations such that in operation during rotation of said reel, the link arm of the cam follower always extends generally outwards perpendicular from the tangent of a lobe of the cam defined by the two first cam engagement locations.

36. A header as claimed in claim 33 wherein:

said cam comprises a first cam mounted in fixed relation to said frame, said first cam having a first cam path which surrounds said reel axis;

said cam follower mechanism comprises: (I) a first cam follower interconnected with a first link arm, said first cam follower engageable for movement along said first cam path around said reel axis; (II) a first crank arm connected to said first link arm proximate a first end of said first link arm, and said first crank arm interconnected to said at least one reel bat;

and wherein said cam mechanism further comprises:

a second cam mounted in fixed relation to said frame, said second cam having a second cam path which surrounds said reel axis;

a second cam follower mechanism comprising: (I) a second cam follower interconnected with a second link arm, said second cam follower engageable for movement along said second cam path around said reel axis; (II) a second crank arm connected to said second link arm proximate a first end of said second link arm, and said second crank arm also interconnected to said at least one reel bat;

such that in operation, rotation of said reel around said reel axis, causes (i) said first cam follower to move along said first cam track, the path of the first cam track being operable to cause said first link arm to transmit a force to said first crank arm and (ii) causes said second cam follower to move along said second cam path, the second cam path being operable to cause said second link arm to transmit a force to said crank arm, thereby causing said first and second crank arms to pivot about said bat pivot axis to thereby rotate said bat member about said bat pivot axis.

37. The header of claim 36 wherein the second cam is adjustable between a plurality of predetermined working positions.

38. The crop harvesting header of claim 36 wherein said first cam follower is a dual first cam follower, operable to engage the first cam at two first cam engagement locations such that in operation during rotation of said reel, the link arm of the first cam follower always extends generally outwards perpendicular from the tangent of a first lobe of the first cam defined by the two first cam engagement locations and wherein second cam follower is a dual cam follower, operable to engage the second cam at two second cam engagement locations such that in operation during rotation of said reel, the second link arm of the second cam follower always extends outwards perpendicular from the tangent of a second lobe of the second cam defined by the two second cam engagement locations.

39. The crop harvesting header of claim 36 wherein the first cam and the second cam define mirrored first cam paths for matched rotation of the first and second ends of the reel bats as the reel shaft is rotated.

40. A header as claimed in claim 36 further comprising:

(a) first end pivot stabilizer comprising:

a first circular end shield attached to the frame and located proximate a first end of said reel said shield having a bat guide that provides a first bat guide path that is generally aligned with said defined circular path; and a first end follower extending out from a first end of said a least one reel bat and being longitudinally aligned with the pivot axis of the bat for engaging the first circular end shield (b) a second end pivot stabilizer, said second end pivot stabilizer comprising:

a second circular end shield attached to the frame and located proximate an opposite end of said reel said second end shield having a second bat guide that provides a second bat guide path that is generally aligned with said defined circular path; and a second end follower extending out from a second, opposite end of said a least one reel bat and being longitudinally aligned with the pivot axis of the bat for engaging the second circular end shield.

41. A crop harvesting header comprising: a reel operable to be rotated about a reel axis, said reel comprising:

(i) at least one radial arm extending generally radially outward from a reel shaft that is aligned with said reel axis, and said at least one radial arm operable for rotation about said reel axis;

(ii) at least one reel bat supported by said at least one radial arm, said at least one reel bat operable for rotation with said radial arm about said reel axis, the at least one reel bat also being operable for pivoting movement about a bat pivot axis radially spaced from said reel axis and oriented generally parallel to the reel axis;

(iii) a reel bat pivoting mechanism operable to cause pivoting movement of said at least one reel bat about said bat pivot axis;

said at least one reel bat having a longitudinally extending bat member oriented in generally parallel relation to said bat pivot axis, with at least one crop finger connected to said bat member, said at least one crop finger extending generally away from said bat member;

the at least one reel bat having a bat arm extending generally orthogonal to said bat pivot axis and being connected to said bat member, said bat arm operable for pivoting movement with said bat member about said bat pivot axis;

said bat arm of said at least one reel bat being pivotally connected at a bat arm connection location to said at least one radial arm to allow for pivoting movement of said bat arm and said bat member about said bat pivot axis relative to said radial arm, during rotation of said reel about said reel axis;

the movement of said bat arm connection location defining a defined circular path, when in operation said reel rotates with said at least one reel bat about said reel axis;

the bat member being operable to be pivoted at said bat arm connection location about its bat pivot axis by pivoting movement of said bat arm relative to said radial arm so that in operation, the angle of the at least one crop finger about the bat pivot axis is varied, during rotation of the reel about the reel axis;

said bat arm, said radial arm and said bat member being configured such that in operation, during rotation of said reel about said reel axis, as said reel bat pivoting mechanism causes pivoting movement of said bat arm and said bat member of said at least one reel bat about said bat pivot axis, said bat member moves in a bat pivot path that extends towards and away from said defined circular path;

wherein said header further comprises a frame configured to support said reel in rotation about said reel axis, and wherein said reel bat pivoting mechanism comprises a cam mechanism comprising:

a cam mounted in fixed relation to said frame, said cam having a cam track which surrounds said reel axis;

a cam follower mechanism comprising: (I) a cam follower interconnected with a link arm, said cam follower engageable for movement along said cam track around said reel axis; (II) a crank arm connected to said link arm, and said crank arm interconnected to said at least one reel bat;

such that in operation, rotation of said reel around said reel axis, causes said cam follower to move along said cam track, the path of the cam track being operable to cause said crank arm mechanism to pivot said bat member of said at least one reel bat about said bat pivot axis;

wherein said cam follower comprises a dual cam follower, operable to engage the cam at two first cam engagement locations such that in operation during rotation of said reel, the link arm of the cam follower always extends generally outwards perpendicular from the tangent of a lobe of the cam defined by the two first cam engagement locations.

42. A crop harvesting header comprising: a reel operable to be rotated about a reel axis, said reel comprising:
  (i) at least one radial arm extending generally radially outward from a reel shaft that is aligned with said reel axis, and said at least one radial arm operable for rotation about said reel axis;
  (ii) at least one reel bat supported by said at least one radial arm, said at least one reel bat operable for rotation with said radial arm about said reel axis, the at least one reel bat also being operable for pivoting movement about a bat pivot axis radially spaced from said reel axis and oriented generally parallel to the reel axis;
  (iii) a reel bat pivoting mechanism operable to cause pivoting movement of said at least one reel bat about said bat pivot axis;
said at least one reel bat having a longitudinally extending bat member oriented in generally parallel relation to said bat pivot axis, with at least one crop finger connected to said bat member, said at least one crop finger extending generally away from said bat member;
the at least one reel bat having a bat arm extending generally orthogonal to said bat pivot axis and being connected to said bat member, said bat arm operable for pivoting movement with said bat member about said bat pivot axis;
said bat arm of said at least one reel bat being pivotally connected at a bat arm connection location to said at least one radial arm to allow for pivoting movement of said bat arm and said bat member about said bat pivot axis relative to said radial arm, during rotation of said reel about said reel axis;
the movement of said bat arm connection location defining a defined circular path, when in operation said reel rotates with said at least one reel bat about said reel axis;
the bat member being operable to be pivoted at said bat arm connection location about its bat pivot axis by pivoting movement of said bat arm relative to said radial arm so that in operation, the angle of the at least one crop finger about the bat pivot axis is varied, during rotation of the reel about the reel axis;
said bat arm, said radial arm and said bat member being configured such that in operation, during rotation of said reel about said reel axis, as said reel bat pivoting mechanism causes pivoting movement of said bat arm and said bat member of said at least one reel bat about said bat pivot axis, said bat member moves in a bat pivot path that extends towards and away from said defined circular path;
wherein said header further comprises a frame configured to support said reel in rotation about said reel axis, and wherein said reel bat pivoting mechanism comprises a cam mechanism comprising:
  a cam mounted in fixed relation to said frame, said cam having a cam track which surrounds said reel axis;
  a cam follower mechanism comprising: (I) a cam follower engageable for movement along said cam track on a path around said reel axis; (II) a crank arm mechanism interconnected to said at least one reel bat;
such that in operation, rotation of said reel around said reel axis, causes said cam follower to move along said cam track, the path of the cam track being operable to cause said crank arm mechanism to pivot said bat member of said at least one reel bat about said bat pivot axis;
and wherein said cam comprises a first cam mounted in fixed relation to said frame, said first cam having a first cam path which surrounds said reel axis;
and wherein said cam follower mechanism comprises (I) a first cam follower interconnected with a first link arm, said first cam follower engageable for movement along said first cam path around said reel axis; (II) a first crank arm connected to said first link arm proximate a first end of said first link arm, and said first crank arm interconnected to said at least one reel bat;
and wherein said cam mechanism further comprises:
  a second cam mounted in fixed relation to said frame, said second cam having a second cam path which surrounds said reel axis;
  a second cam follower mechanism comprising: (I) a second cam follower interconnected with a second link arm, said second cam follower engageable for movement along said second cam path around said reel axis; (II) a second crank arm connected to said second link arm proximate a first end of said second link arm, and said second crank arm also interconnected to said at least one reel bat;
such that in operation, rotation of said reel around said reel axis, causes (i) said first cam follower to move along said first cam track, the path of the first cam track being operable to cause said first link arm to transmit a force to said first crank arm and (ii) causes said second cam follower to move along said second cam path, the second cam path being operable to cause said second link arm to transmit a force to said crank arm, thereby causing said first and second crank arms to pivot about said bat pivot axis to thereby rotate said bat member about said bat pivot axis;
said header further comprising:
(a) a first end pivot stabilizer comprising:
  a first circular end shield attached to the frame and located proximate a first end of said reel said shield having a bat guide that provides a first bat guide path that is generally aligned with said defined circular path; and
  a first end follower extending out from a first end of said a least one reel bat and being longitudinally aligned with the pivot axis of the bat for engaging the first circular end shield
(b) a second end pivot stabilizer, said second end pivot stabilizer comprising:
  a second circular end shield attached to the frame and located proximate an opposite end of said reel said second end shield having a second bat guide that provides a second bat guide path that is generally aligned with said defined circular path; and a second end follower extending out from a second, opposite end of said a least one reel bat and being longitudinally aligned with the pivot axis of the bat for engaging the second circular end shield.

* * * * *

UNITED STATES PATENT AND TRADEMARK OFFICE
CERTIFICATE OF CORRECTION

| | |
|---|---|
| PATENT NO. | : 9,844,183 B2 |
| APPLICATION NO. | : 14/226796 |
| DATED | : December 19, 2017 |
| INVENTOR(S) | : Gregory Honey and Glenn Honey |

It is certified that error appears in the above-identified patent and that said Letters Patent is hereby corrected as shown below:

In the Claims

Column 24 to 25, Lines 65 to 70, the portion of Claim 41 reading, "a cam follower mechanism comprising: (I) a cam follower interconnected with a link arm, said cam follower engageable for movemnet along said cam track around said reel axis; (II) a crank arm connected to said link arm, and said crank arm interconnected to said at least one reel bat;" should read -- a cam follower mechanism comprising: (I) a cam follower engageable for movement along said cam track on a path around said reel axis; (II) a crank arm mechanism interconnected to said at least one reel bat; --

Signed and Sealed this
Twenty-seventh Day of March, 2018

Andrei Iancu
*Director of the United States Patent and Trademark Office*